United States Patent [19]

Somes

[11] 4,360,998
[45] Nov. 30, 1982

[54] ABSOLUTE GRAIN LOSS MONITOR

[75] Inventor: Richard K. Somes, Berlin, Mass.

[73] Assignee: Sperry Corporation, New York, N.Y.

[21] Appl. No.: 248,618

[22] Filed: Mar. 27, 1981

[51] Int. Cl.³ .................... A01D 45/00; A01D 75/00
[52] U.S. Cl. ............................ 56/10.2; 56/DIG. 15
[58] Field of Search ..................... 56/10.2, DIG. 15; 130/27 R, 27.2, 24, 27 Y

[56] References Cited

U.S. PATENT DOCUMENTS

| | | | |
|---|---|---|---|
| 3,593,720 | 7/1971 | Botterill et al. | 56/DIG. 15 |
| 3,610,252 | 10/1971 | De Corne et al. | 56/DIG. 15 |
| 3,638,659 | 2/1972 | Dahlquist et al. | 56/DIG. 15 |
| 3,935,866 | 2/1976 | Northrup et al. | 56/DIG. 15 |
| 4,149,415 | 4/1979 | Harbour | 56/DIG. 15 |
| 4,230,130 | 10/1980 | Staiert | 56/10.2 |
| 4,259,829 | 4/1981 | Strubbe | 130/27 R |

FOREIGN PATENT DOCUMENTS

| | | | |
|---|---|---|---|
| 2908635 | 9/1979 | Fed. Rep. of Germany | 56/10.2 |
| 470271 | 8/1975 | U.S.S.R. | 56/10.2 |

Primary Examiner—Paul J. Hirsch
Attorney, Agent, or Firm—Howard P. Terry

[57] ABSTRACT

The indirect measurement of the absolute volume of grain which does not fall through the chaffer sieve of a combine harvester and is discharged out the rear of the combine is calculated from the output signals provided by a matrix of sensors which are disposed about the cleaning sieve and which are capable of detecting the precipitating grain flow.

8 Claims, 7 Drawing Figures

ABSOLUTE GRAIN LOSS MONITOR

BACKGROUND OF THE INVENTION

1. Field of the Invention

The present invention relates generally to mobile grain harvesting equipment such as the combine harvester in which means for measuring the absolute grain loss as a function of the input grain flow on the area harvested is desired.

2. Description of the Prior Art

As mobile combines are harvesting in the field, the grain is threshed and separated from the straw and stored in a storage bin within the combine for later delivery to another vehicle for transport from the field. The material harvested enters the combine through a header portion and is elevated through the elevator housing into the threshing and separating units within the combine. The threshing separating units receive unthreshed crop material and generally separate the grain from the straw by means of a rubbing or beating motion. The grain and other unthreshed crop material separated from the straw falls from the threshing and separating units onto the grain handling and cleaning means, while the straw is discharged from the rear of the separating unit through an opening in the hood of the combine. The grain handling and cleaning mechanism includes means to separate the light straw or chaff from the grain and means to segregate the unthreshed material (known in the art as tailings) from the grain in order to collect the clean grain in a grain bin or tank located at the top of the combine. The grain handling and cleaning mechanism comprises an oscillating grain pan, oscillating sieves and a fan. The grain pan, disposed beneath the threshing and separating units, receives the threshed material therefrom and discharges the threshed material to oscillating sieves disposed rearwardly and below the grain pans. The vibration or oscillation of the grain pan causes the threshed material to move rearwardly to be discharged onto the sieves below and thus subjected to the air flow from the cleaning fan. The fan, moreover, blows a sufficient volume of air through the apertures provided in the sieves to aerodynamically separate the grain from the chaff. Accordingly, the chaff and other small trash material are suspended in the airstream and are discharged through a rear opening in the combine while the grain drops to the sieves below. The upper sieve or chaffer is provided with means for adjusting the apertures such that the grain received thereon may fall therethrough while the larger trash material is shaken rearwardly for discharge from the combine. In addition, the lower or cleaning sieve disposed beneath the chaffer sieve includes adjustable apertures such that only the grain drops therethrough to a guide where it may be collected for elevation to the grain bin. Any larger material (generally known in the art as tailings) which falls onto the lower sieve is discharged rearwardly and collected within the combine to be elevated and returned into the feed section of the threshing and separating units for reprocessing of the grain attached thereto. If the combine harvester is improperly adjusted or operating at an inefficient ground speed, a substantial quantity of grain will not drop through the chaffer sieve for cleaning on the cleaning sieve. This grain, along with the chaff and other small trash material, is discharged through the rear opening in the combine while most of the grain drops to the cleaning sieve below. This source of grain loss is particularly significant in a combine harvester having axial flow threshing separating units such as the one disclosed in U.S. Pat. No. 3,669,122 and assigned to the Applicant's assignee. The axial flow type combine harvester differs from the more conventional combine harvester in the design of the threshing and separating means, and as a result the axial flow type combine harvester has negligible grain losses from the separating means under most harvesting conditions. Whereas, in the more conventional combine harvester the straw walker separation means is the predominant source of losses. Thus, there is an especially important need for determining the absolute grain loss which results from grain being discharged beyond the rearward portion of the chaffer sieve in an axial flow type combine harvester.

The methods for measuring grain loss fall into two general categories which are independent of the sensing technology utilized. These categories may be referred to as direct measurements and indirect measurements. The indirect measurement category would include methods which measure the internal grain flow to calculate the amount of grain discharged from the combine. Whereas, a direct measurement is one in which the material discharged through a rear opening in the combine contains dust, straw, chaff, and grain, and the amount of grain contained therein is monitored by a sensor which responds to the grain in a fashion which is distinctive from the responses produced by the other materials. The ability to discriminate between grain and the other materials is crucial to a successful direct measurement. Since the kernel of grain is much harder than the straw and chaff, acoustic impacts on sensors have been utilized to detect the presence of grain in the trash materials. The impact of grain on a resilient surface coupled to a piezoelectric transducer induces output signals having a relatively fast rise time and a damped sinusoidal decay which is characteristic of this type of sensor. These acoustic sensors, however, may not accurately detect the presence of grain impactions when harvesting conditions vary or when the grain flow rate is too great to be resolved into individual impactions. Acoustic sensors of this type have heretofore been disclosed in several prior art patents for use in grain loss monitors. For example, a grain loss monitor for a combine harvester utilizing an acoustic sensor and responsive to a single varying harvesting condition, i.e. ground speed, is disclosed in U.S. Pat. No. 3,935,866, issued Feb. 3, 1976, assigned to Allis-Chalmers Corporation and entitled "Grain Loss Monitor". The disclosed grain loss monitor derives a grain loss rate signal in accordance with the number of grain impactions upon an impact sensor and a ground speed signal proportional to the ground speed of the combine. The grain loss rate signal is divided by the ground speed signal to drive an analog display of the grain loss per unit area which is independent of time. The preferred embodiment of this invention includes a one shot multivibrator which is triggered to its unstable state to generate a fixed width pulse each time a kernel impacts the acoustic sensor, a tachometer coupled to the combine wheels and a period time integrator triggered by the tachometer pulses derive a unidirectional ground speed voltage inversely proportional to the frequency of the tachometer pulses. A pulse frequency modulation chopper circuit is turned on and off by the fixed width one shot pulses and has its peak voltage controlled by the unidirectional ground speed signal for accomplishing division of grain loss rate by the combine ground speed. An averaging circuit determines the average voltage of the chopper output pulses as an analog of the grain loss per unit area, thus providing the grain loss indication. This grain loss indication, however, is subject to inaccuracies, since harvesting conditions other than ground speed vary the total amount of grain discharged through the rearward portion of the combine harvester. Additionally, the acoustic impact sensor samples only a portion of the discharged material, which varies as a function of the ground speed, pitch angle, roll angle, and crop conditions. Furthermore, there is a significant problem of grain adhesion in moist crops which drastically reduces the proportion of loss grain which is free to impact upon the acoustic sensor. Thus, the accuracy of this grain loss monitor is severely constrained by harvesting conditions.

Another grain loss monitor utilizing acoustic sensors is disclosed in U.S. Pat. No. 4,036,065, issued on July 19, 1977 to Strelioff et al, and assigned to Senstek Ltd. Acoustic sensors are disposed across the rear of a sieve of a combine to sense a percentage of the grain lost, and the sound is picked up by a microphone, amplified, filtered and fed to a ratio computing device which calculates the total grain loss from the sampling and displays it on a meter. A second sensor samples grain passing through the rear portion of a straw walker, and since the sample is representative of grain passing over the end of the straw walker, it can be used to calculate the grain loss over the end of the straw walker. The sound from the second sensor is picked up by a microphone, amplified, filtered and fed into a ratio computing device and displayed on a meter. The two grain losses may be displayed individually or collectively. In any event, the Senstek apparatus, like the Allis Chalmers apparatus, is subject to the inaccuracies induced by varying harvesting conditions.

Accordingly, there is a need to provide the agricultural machine industry with a solution to the problem of determining the absolute grain loss of a combine harvester under the widely varying conditions which are present during typical harvesting operations. The acoustic impact sensors which are positioned to sample only a percentage of the grain provide the only direct measure of absolute grain loss, but these measurements are very qualitative in nature and subject to wide variations and therefore to interpretation. The practice of the present invention which would provide for an indirect measurement of absolute grain loss, therefore, would provide the agricultural machine industry with a solution to the problems associated with the measurement of absolute grain loss.

SUMMARY OF THE INVENTION

According to the invention, apparatus is provided for measuring and alerting the operator of a combine harvester of an absolute loss of grain which exceeds a predetermined value that is considered the maximum permissible loss for efficient operation. Illustratively, the apparatus of this invention comprises a plurality of sensors, disposed in rows along a sieve within the combine, which are coupled to computing circuitry and a means of display for alerting the operator when the absolute grain loss is excessive. Specifically, the apparatus of this invention comprises a matrix of sensors disposed at selected sites on the cleaning sieve within the combine. Sensors are used to detect a count of the grain kernels passing through the sieve at selected locations. Output signals from the sensors are applied to a computing means to generate grain precipitation functions which approximately describe the distribution of grain passing through the sieve during a predetermined interval. The equations, representing the volumetric distribution of grain, are then extrapolated to a point beyond the end of the cleaning sieve. These extrapolated values, which represent the grain loss beyond the rearward portion of the sieve during a predetermined time interval, are determined mathematically through the use of determinants and summed to provide an estimate of the absolute grain loss. When the absolute grain loss exceeds a predetermined value, display means are activated to warn the operator of the excessive absolute grain loss.

DESCRIPTION OF THE PREFERRED EMBODIMENT

Figure 1:
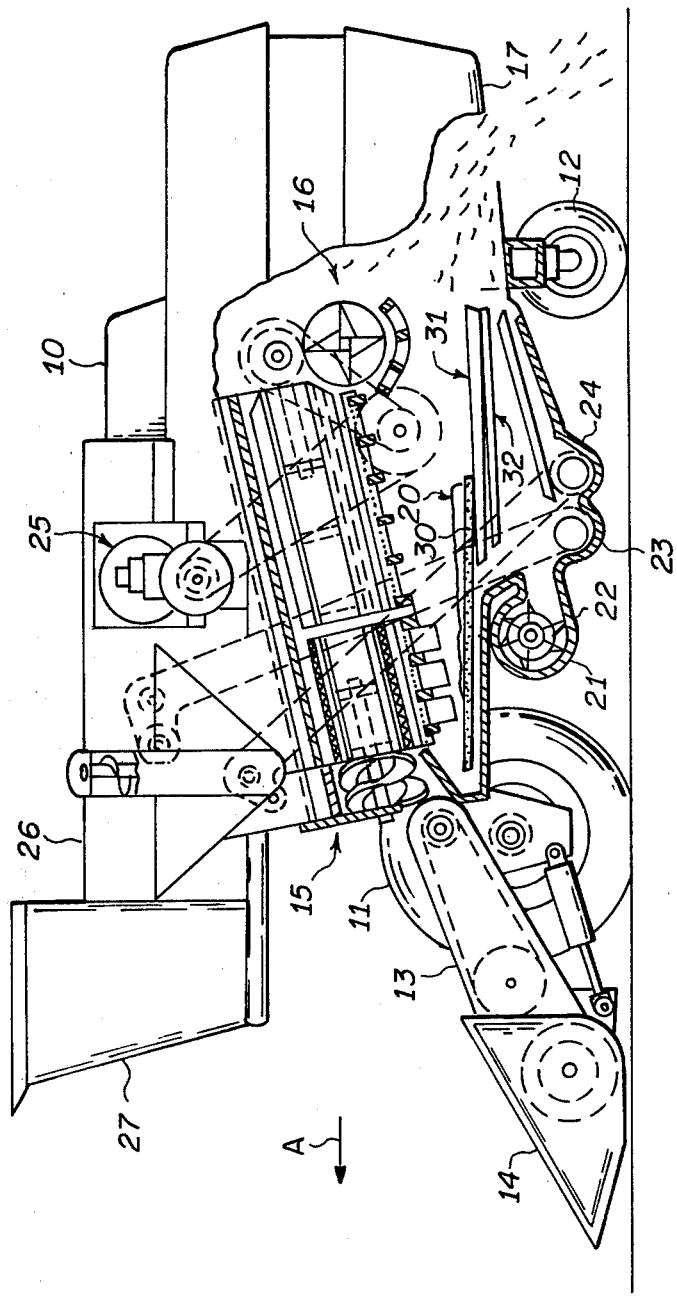
FIG. 1 is a side elevation of a combine harvester, partially in section, that embodies principals of the invention.

The invention will be described with reference to a self-propelled combine harvester. Refer to FIG. 1 wherein the direction of travel of the combine, designated by arrow A, is opposite to the direction of the movement of the crop material, grain and straw, through the combine. "Grain" as used herein refers to all crop material that may be threshed, while "straw" refers to all discardable crop material other than grain covering material called "chaff". A combine harvester includes a mobile main frame or housing means 10 supported on front drive wheels 11 and rear steerable wheels 12, the wheels being transversely spaced apart on opposite sides of the frame. A crop elevator housing 13 and a header 14 are mounted on the front of the main housing 10 to harvest the grain crop and feed it to the threshing and separating units 15 mounted in the main housing 10. The threshing and separating units thresh and separate the grain from the crop material and discharge the straw onto a rear beater 16 for discharge from the rear of the combine, generally through a large bottom opening in the hood 17. Grain cleaning means 20 are provided within the main housing for separating the chaff from the grain. An encasement 21 extends below the main frame for housing a fan 22 and the grain and tailings collecting means 23 and 24 respectively. On the top of the combine is an engine 25 and a grain tank 26 with a hinged unloading auger, (not shown). An operator's cab 27 is mounted on the front of the housing 10 above the crop elevator housing 13.

Threshing and separating units 15 separate the grain from the straw and discharge the grain and other crop bearing material onto the cleaning means 20. The cleaning means 20 includes a grain pan 30, a first or chaffer sieve 31 and a second or cleaning sieve 32 which cooperate with the fan 22 to clean the grain. Ideally, the reciprocating action of the grain pan 30 separates the grain, the chaff, and the straw into different layers and deposits them on the first or chaffer sieve 31. The chaffer sieve 31 and the lower or cleaning sieve 32 move with reciprocating action in opposite directions, thus permitting the grain to fall through the sieves. The fan 22 cooperates with the chaffer sieve 31 and cleaning sieve 32 to aerodynamically discharge the undesired chaff and straw. Substantial amounts of grain, however, may be discharged with the chaff and straw in an incorrectly adjusted or operated combine harvester. In an axial flow type combine harvester the most significant grain loss occurs when grain is discharged over the rearward portion of the chaffer sieve 31.

Figure 2:
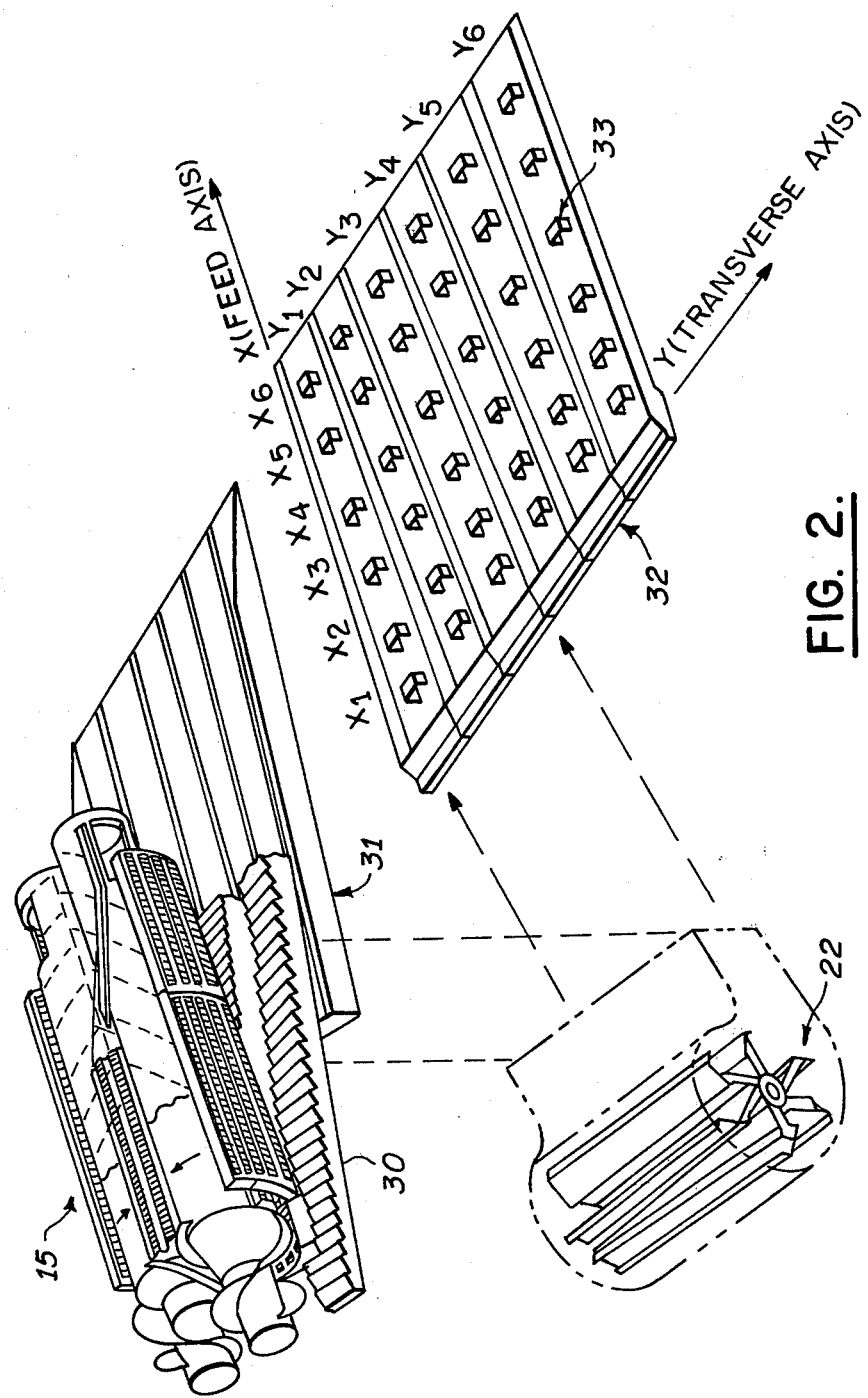
FIG. 2 is a detail view of a portion of the internal components of the combine of FIG. 1, illustrating therein sensor locations that may be utilized with the invention.

In FIG. 2, an isometric detail view of the threshing and separating units 15 of an axial flow type combine, grain cleaning fan 22, chaffer sieve 31, and cleaning sieve 32, and the grain pan 30 is provided. The cleaning sieve 32 is divided into a plurality of sections along a Y-axis that is transverse to the material flow, each section having a plurality of sensors 33 evenly distributed along an X-axis that is parallel to the material flow. The sensors 33, which detect grain falling through the sieve, may be positioned in a matrix configuration at designated X and Y positions to determine the amount of grain falling through the cleaning sieve 32 at these discrete locations.

Figure 3:
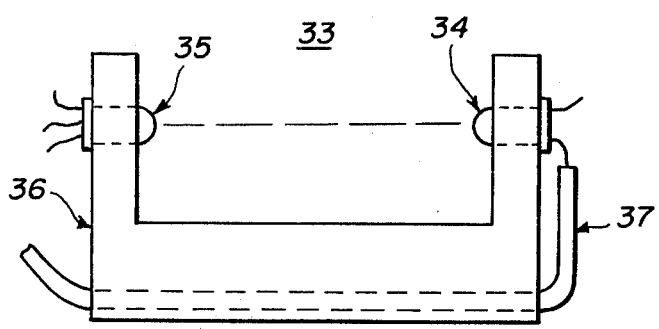
FIG. 3 is a side view of an electrooptic sensor that may be utilized with the invention.

Refer now to FIG. 3, wherein a side view of an electrooptic sensor that may be utilized as the grain sensor 33 is illustrated. This electrooptic sensor may include a U-shaped channel 36, preferably constructed of fiber glass or other electrically insulating material, with a light emitting diode 34 (LED) positioned on one side of the U and a phototransistor 35 positioned on the other side thereof. The output of the LED 34 illuminates the phototransistor 35 and causes it to draw collector current. When an obstruction, such as precipitating grain, obscures the optical path between the LED 34 and the phototransistor 35, the current is interrupted, causing the collector voltage to rise.

The phototransistor 35 may be a General Electric LED 55C which produces a total power output of 5.4 mW at infrared wavelengths when biased at 100 mA. This LED is fitted with a focussing lens which reduces the half power beam width of radiation to approximately 15 degrees, thereby increasing the intensity of energy in the direction of the detector. The phototransistor 35 may be a Texas Instrument's TIL 81 which is also fitted with a focussing lens to provide a half power beam width of approximately 15 degrees.

Figure 4:
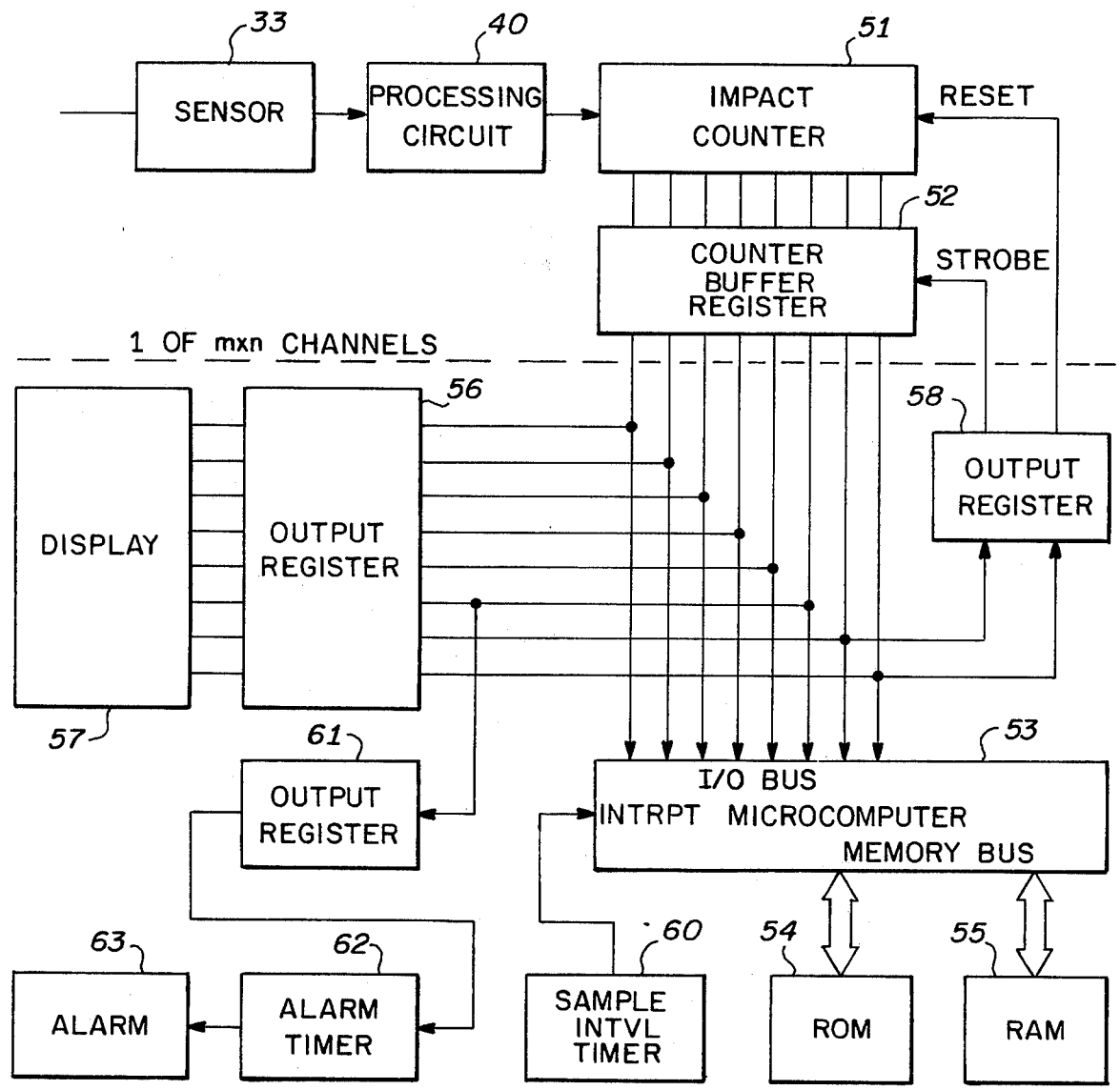
FIG. 4 is a block diagram of an embodiment of the invention.

In FIG. 4 a functional block diagram of the electrical components that may be used to practice the present invention is shown. Each sensor 33 may be coupled to a processing circuit 40 which provides pulse shaping. The output signal pulses from the processing circuits 40 may be applied to an 8 bit binary counter 51 which is capable of counting up to 255 pulses in a predetermined time interval. The stages of binary counter 51 are parallel coupled to corresponding stages of an 8 bit latch 52. Each latch 52 is coupled to a microprocessor 53 such as the Intel 8080 which is programmed by a read only memory (ROM) 54 and utilizes a READ-WRITE random access memory (RAM) 55 as a scratch pad. Microprocessor 53 also provides strobe pulses to the latch 52 and reset pulses to the counter 51 via a register 58. Processed data may be coupled to an output latch 56 which may drive a display device 57 such as a cathode ray tube. Results of the grain loss computations are displayed on the display device 57 and updated once each processing cycle. The microprocessor processing cycle is timed by a sample interval timer 60 which interrupts the microprocessor 53 after a predetermined time interval has elapsed to restart the processing cycle. A second output register 61, coupled to an alarm 63 via an alarm timer 63, may be coupled to one output line of the microprocessor 53. Should a computation exceed a specified time interval, the alarm 63 alerts the operator of the combine harvester to a possible malfunction.

Figure 6:
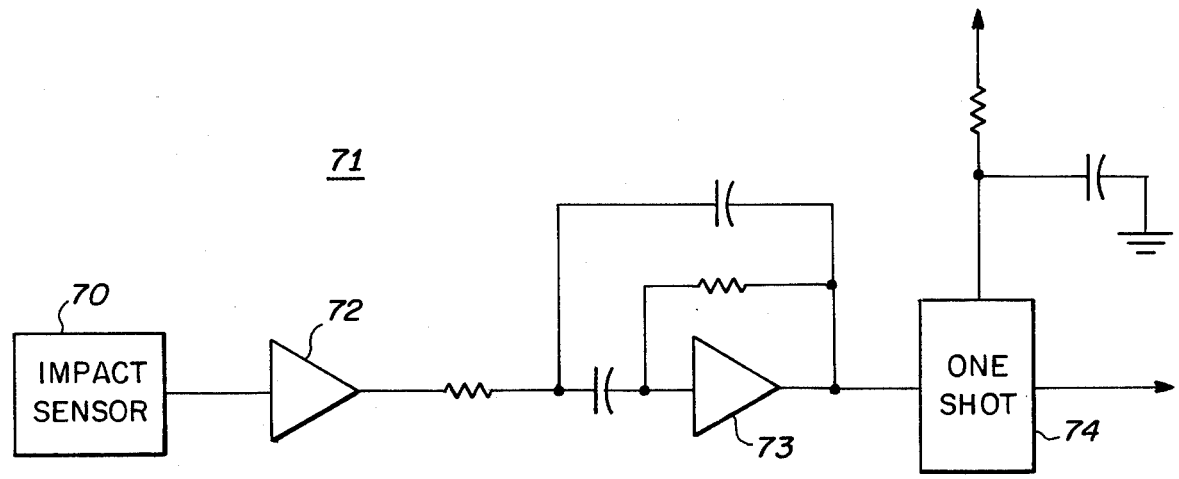
FIG. 6 is a schematic diagram of a processing circuit and impact sensor that may be utilized with the invention.

Sensors other than the electrooptic sensor described above may be employed for grain counting, as for example, the acoustic sensor 70 with the processing circuit 71 shown in FIG. 6. Acoustic sensors for detecting the impaction of grain are well known in the art. An acoustic sensor of a design similar to that disclosed in U.S. Pat. No. 3,610,252 may be suitable for use with the present invention. Each grain impact on the acoustic impact sensor 70 causes a damped sinusoidal output signal to be coupled to an active band pass filter 73. The filtered output signal is applied to the monostable multivibrator 74 which converts the filtered output signal into a single positive going rectangular pulse for each grain impact. The output signals from the monostable multivibrator 74 are then applied to the 8 bit binary counters 51 as illustrated in FIG. 4.

It should be noted, that the acoustic impact sensor 70 described above is an alternative to the optical sensor 33 utilized in the preferred embodiment of this invention. Although most of the material which reaches the lower or cleaning sieve is clean grain, there is always some trash material contained therein. The optical sensor 33 responds indiscriminately to the passage of trash material as well as to the desired clean grain. When a grain count accuracy greater than that achievable with an electrooptic sensor is desired, the increased cost and complexity of an acoustic impact sensor may be justified.

Figure 5:
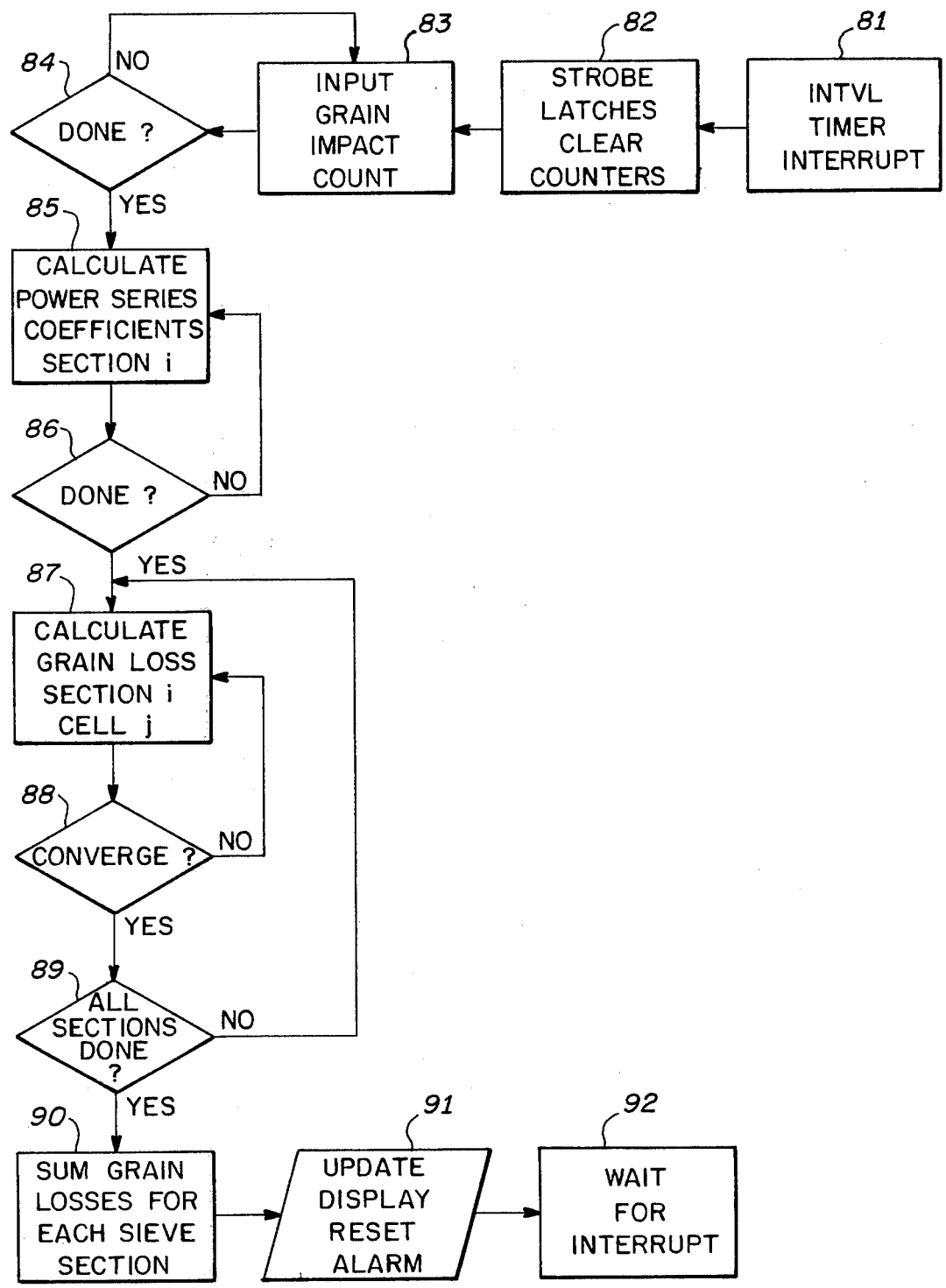
FIG. 5 is a flow chart of the operations that may be performed by the microcomputer of FIG. 4.

Referring now to FIG. 5, a flow chart from which a computer program may be written to implement the practice of the present invention is provided. The microprocessor 53 is the preferred computing means for performing the computations necessary to solve the algorithm for grain losses, and the flow chart illustrates the operations that the microprocessor must perform.

Figure 7:
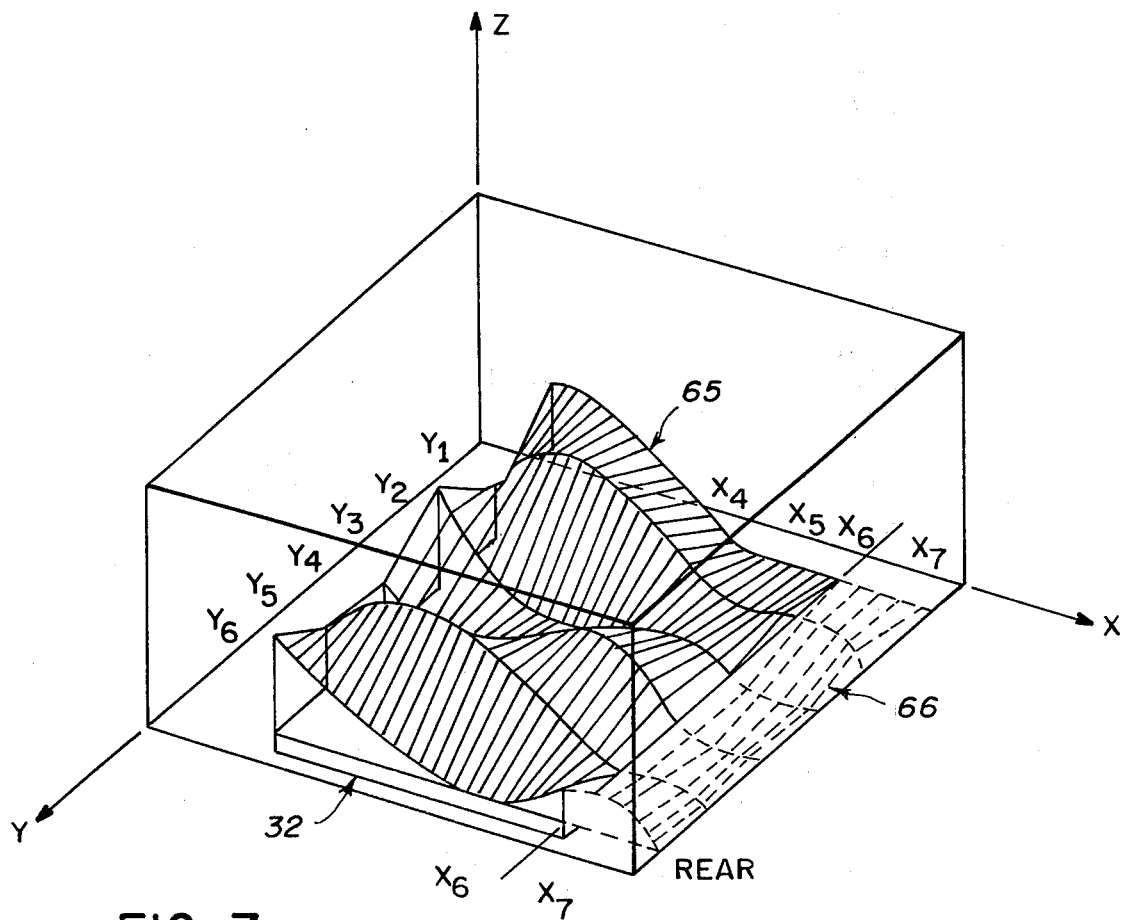
FIG. 7 is a three dimensional plot of a possible grain distribution through the cleaning sieve of a combine during a predetermined time interval.

The distribution along the sieve 32 of grain volume falling therethrough during a predetermined time interval as illustrated in FIG. 7. The end of the sieve 32 is represented by the line between X6 and X7. In FIG. 7, the solid lines 65 represent the distributed volume of grain falling through the cleaning sieve 32 and the dotted lines 66 represent the extrapolated volume of grain which is blown over the rearward portion of the chaffer sieve 31 and discharged from the rear of the combine. The cleaning sieve 32 is divided into six sections along the Y axis, each section running parallel to the X axis. Thus, X, Y coordinates designate points on the sieve and Z coordinates designate the volume of grain at each X, Y position. Thus, the data from the sensors in each section of the sieve may be utilized to obtain a plot of grain volume through the sieve versus position on the sieve along the X-axis.

The practice of the present invention provides the indirect calculation of the actual volume of grain which does not fall through the cleaning sieve 32. Sensors 33 are disposed along the cleaning sieve in a matrix-like configuration that can be plotted on the coordinate system as depicted in FIG. 2 and FIG. 7. The sensors detect precipitating grain which may be used to generate a grain precipitation function along sections of the cleaning sieve. A minimum of four sensors along the X axis are probably necessary to generate the grain precipitation function, F(x, y).

The numerical data thus acquired from the sensors may represent a quantized approximation of the function F(x, y), the grain precipitation function. Since measurements are made at discrete points on the sieve, we can call the function F(i, j). F(i, j) is an integer function of integer variables $0 \leq i \leq m$ and $0 \leq j \leq n$ which estimates the values of the continuous function F(x, y).

The total grain precipitated in the sieve is represented by:

$$\sum_{j=0}^{n} \sum_{i=0}^{m} F(i,j).$$

The total grain input to the sieve is represented by:

$$\sum_{j=0}^{n} \sum_{i=0}^{\infty} F(i,j) \quad F(i,j) = 0 \text{ for } j > n.$$

The grain loss from the sieve is:

$$\sum_{j=0}^{n} \sum_{i=m+1}^{\infty} F(i,j).$$

Because F(i, j) is only defined numerically for $0 \leq j \leq n$, $0 \leq i \leq m$, the values of the function must be extrapolated for $i \to \infty$ in order to estimate grain loss. This can be done by forming a power series representation of F(i, j) in terms of i(x axis) for each j(y axis).

$$F(i,j) = \sum_{k=0}^{\infty} a_{jk} i^k$$

where $a_{jk}$ is a coefficient of the series which is a function of j.

The values of $a_{jk}$ can be evaluated for a finite number of terms in the power series using determinants. Deleting the dependence on j for notational simplicity, and considering a six sensor section, the coefficients $a_k$, for each section, may be determined from the determinant:

$$\begin{vmatrix} F(i) & 1 & i & i^2 & i^3 & i^4 & i^5 \\ F_1 & 1 & 1 & 1 & 1 & 1 & 1 \\ F_2 & 1 & 2 & 4 & 8 & 16 & 32 \\ F_3 & 1 & 3 & 9 & 27 & 81 & 243 \\ F_4 & 1 & 4 & 16 & 64 & 256 & 1{,}024 \\ F_5 & 1 & 5 & 25 & 125 & 625 & 3{,}125 \\ F_6 & 1 & 6 & 36 & 216 & 1{,}296 & 7{,}776 \end{vmatrix} = 0$$

In this formulation the function F(i) has a coefficient:

$$K = \begin{vmatrix} 1 & 1 & 1 & 1 & 1 & 1 \\ 1 & 2 & 4 & 8 & 16 & 32 \\ 1 & 3 & 9 & 27 & 81 & 243 \\ 1 & 4 & 16 & 64 & 256 & 1{,}024 \\ 1 & 5 & 25 & 125 & 625 & 3{,}125 \\ 1 & 6 & 36 & 216 & 1{,}296 & 7{,}776 \end{vmatrix}$$

The coefficients of the equation are:

$$Ka_0 = \begin{vmatrix} F_1 & 1 & 1 & 1 & 1 & 1 \\ F_2 & 2 & 4 & 8 & 16 & 32 \\ F_3 & 3 & 9 & 27 & 81 & 243 \\ F_4 & 4 & 16 & 64 & 256 & 1{,}024 \\ F_5 & 5 & 25 & 125 & 625 & 3{,}125 \\ F_6 & 6 & 36 & 216 & 1{,}296 & 7{,}776 \end{vmatrix}$$

$$-Ka_1 = \begin{vmatrix} F_1 & 1 & 1 & 1 & 1 & 1 \\ F_2 & 1 & 4 & 8 & 16 & 32 \\ F_3 & 1 & 9 & 27 & 81 & 243 \\ F_4 & 1 & 16 & 64 & 256 & 1{,}024 \\ F_5 & 1 & 25 & 125 & 625 & 3{,}125 \\ F_6 & 1 & 36 & 216 & 1{,}296 & 7{,}776 \end{vmatrix}$$

$$Ka_2 = \begin{vmatrix} F_1 & 1 & 1 & 1 & 1 & 1 \\ F_2 & 1 & 2 & 8 & 16 & 32 \\ F_3 & 1 & 3 & 27 & 81 & 243 \\ F_4 & 1 & 4 & 64 & 256 & 1{,}024 \\ F_5 & 1 & 5 & 125 & 625 & 3{,}125 \\ F_6 & 1 & 6 & 216 & 1{,}296 & 7{,}776 \end{vmatrix}$$

$$-Ka_3 = \begin{vmatrix} F_1 & 1 & 1 & 1 & 1 & 1 \\ F_2 & 1 & 2 & 4 & 16 & 32 \\ F_3 & 1 & 3 & 9 & 81 & 243 \\ F_4 & 1 & 4 & 16 & 256 & 1{,}024 \\ F_5 & 1 & 5 & 25 & 625 & 3{,}125 \\ F_6 & 1 & 6 & 36 & 1{,}296 & 7{,}776 \end{vmatrix}$$

$$Ka_4 = \begin{vmatrix} F_1 & 1 & 1 & 1 & 1 & 1 \\ F_2 & 1 & 2 & 4 & 8 & 32 \\ F_3 & 1 & 3 & 9 & 27 & 243 \\ F_4 & 1 & 4 & 16 & 64 & 1{,}024 \\ F_5 & 1 & 5 & 25 & 125 & 3{,}125 \\ F_6 & 1 & 6 & 36 & 216 & 7{,}776 \end{vmatrix}$$

$$-Ka_5 = \begin{vmatrix} F_1 & 1 & 1 & 1 & 1 & 1 \\ F_2 & 1 & 2 & 4 & 8 & 16 \\ F_3 & 1 & 3 & 9 & 27 & 81 \\ F_4 & 1 & 4 & 16 & 64 & 256 \\ F_5 & 1 & 5 & 25 & 125 & 625 \\ F_6 & 1 & 6 & 36 & 216 & 1{,}296 \end{vmatrix}$$

Each determinant may be expanded by co-factors on the first column to achieve a result of the general form $$a = \frac{1}{K}(F_1 D_{11} - F_2 D_{21} + F_3 D_{31} - F_4 D_{41} + F_5 D_{51} - F_6 D_{61})$$

The function F(i, j), which is defined numerically for $0 \leq j \leq m$ may be extrapolated along the x axis using the finite series approximation developed on the preceding pages:

$$F(i,j) = a_{0j} + a_{1j}i + a_{2j}i^2 + a_{3j}i^3 + a_{4j}i^4 + a_{5j}i^5.$$

The curve fitting exercise for each position y along the transverse axis must be performed. Then Grain Input $$\Phi_i \simeq \sum_{j=0}^{n} \sum_{i=0}^{\infty} [a_{0j} + a_{1j}i + a_{2j}i^2 + a_{3j}i^3 + a_{4j}i^4 + a_{5j}i^5].$$

Grain Loss $$\Phi_i \simeq \sum_{j=0}^{n} \sum_{i=m}^{\infty} [a_{0j} + a_{1j}i + a_{2j}i^2 + a_{3j}i^3 + a_{4j}i^4 + a_{5j}i^5].$$

The series can be tested numerically for convergence as each successive term is added, and the summation of i can be truncated when an acceptable level of error is achieved in the calculation.

In practice only the grain loss part of the calculation need be done since $$\sum_{i} \sum_{j} F(i,j)$$

can be formed from the numerical data acquired by the sensors.

The operation of the present invention is predicated upon the assumption that the grain distributed in a hypothetical volume along the grain cleaning means of the combine harvester may be fitted to a plurality of curves generated by the grain precipitation function and these curves may be extrapolated beyond the rearward portion of the combine harvester to indirectly determine the absolute volume of grain discharged out the rear of the combine harvester. The advantage of this approach over the prior art is that as operating conditions such as moisture content, ground speed, pitch angle, roll angle, etc. vary the amount of grain passing through the cleaning sieve, the amount of grain being discharged at the rear of the harvester will vary dependently. Thus, the indirect measurement of the absolute volume of grain discharged out the rear of the combine harvester is calculated from the direct measurement of grain passing through the cleaning sieve. These calculations are performed by the microprocessor 53 and its associated components as depicted in FIG. 4.

A computational sequence for the microprocessor 53 to determine the grain volume distribution from the sieve sensor data may be as shown in the flow chart of FIG. 5. Rectangular block 81 denotes a statement that the interval timer 60 initiates the processing cycle by causing the microprocessor 53 to strobe all the latches and reset all the counters 51 as stated in the rectangular block 82. Counter output data, held in the latches, is then sequentially acquired by programmed I/O instructions 83 and stored in the random access memory 55. Once the data is acquired, decision statement 84 instructs the microprocessor 53 to begin the calculations as noted by the statement in the rectangular block 85. The microprocessor 53 then calculates the coefficients of the polynomial for each section of the cleaning sieve 32. Once these calculations are completed, decision statement 86 instructs the microprocessor 53 to begin to calculate the grain losses, as noted by the statement in block 87. The grain loss for each section is calculated by numerically integrating the extrapolated portions of linear equations generated by the power series which are representative of the grain loss. This integration is performed for an arbitrary number of interations or until some convergence criterion denoted by decision statement 88 is satisfied. When the grain loss estimates for the cell sections are completed as determined by decision statement 89, they are summed and scaled with respect to the total volume of grain calculated according to statement 90. Statement 91 instructs the microprocessor 53 to apply the result to some display or utilization means.

If the statement 92 denoting an interval timer interrupt instruction occurs prior to the completion of the grain loss calculation, the program branches unconditionally to the starting point and an update of the display would not occur. Such a condition indicates that the calculation of grain loss has failed to converge within the prescribed accuracy. This condition could be indicative of gross malfunction of the combine due either to mechanical failure or sieve overloading. In FIG. 4, an alarm circuit is included which is set off by a timer of duration somewhat longer than the averaging interval. The timer 62 would be reset each time a display update occurs thereby inhibiting the alarm 63 under normal circumstances. Alternatively, the loss could be extrapolated to convergence but with a finite limit on the number of terms to be calculated. This would guarantee completion of the calculation within the averaging interval. An audible or visual alarm 63 may be triggered by the microprocessor 53 when the series extrapolation fails to converge within the limit of power series length imposed arbitrarily by the program.

A computer programmer of ordinary skill could write a computer program using the flow chart depicted in FIG. 5 and the mathematical relationships described above. An assembler or compiler could then translate this source program into a machine readable code suitable for execution by the microprocessor 53.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for measuring grain lost from a combine harvester which includes a sieve wherethrough grain is collected comprising:

sensor means disposed in rows corresponding to sectional areas of said sieve for providing signals representative of grain volume distribution through each sectional area;

means responsive to said signals provided by said sensor means for computing grain volume passed rearward of said sieve during a predetermined time interval; and means responsive to signals from said computing means for providing signals when said grain volume passed rearward during said predetermined time interval exceeds an established threshold.

2. An apparatus for measuring the absolute grain loss of a combine harvester having grain cleaning means which includes sieve means, said measuring apparatus comprising:

sensing means having a plurality of sensors disposed in a plurality of rows which correspond to sectional areas of said sieve means, for providing output signals representative of grain passing through each sectional area of said sieve means;

computing means responsive to the sensor output signals for counting the amount of grain passing through each sectional area of said sieve means during a predetermined time interval, for generating curves represented by power series expansion derived from the grain counted, for extrapolating the curves to a point beyond the rearward portion of said sieve means, and for computing the absolute volume of grain represented by the extrapolated portions of the curves; and utilization means responsive to said computing means for providing a signal when the amount of grain represented by the extrapolated portions of the curves exceeds a predetermined amount.

3. An apparatus according to claim 2 wherein said sensing means having said plurality of sensors includes sensors comprised of light emitting means and associated transducer means responsive thereto which provide output signals when objects obscure the optical paths therebetween.

4. An apparatus according to claim 2 wherein said sensing means having said plurality of sensors includes electrical transducers responsive to the impaction of grain thereon.

5. An apparatus according to claim 3 or 4 wherein said computing means includes a programmed microprocessor means for transforming the data from the output signals of the sensing means into linear equations which represent the volumetric distribution of grain and which can be expanded using a power series expansion.

6. An apparatus according to claim 5 wherein said utilization means includes an audio alarm.

7. An apparatus according to claim 5 wherein said utilization means includes a visual display.

8. A method of detecting the absolute grain loss of a combine harvester having a grain cleaning means which comprises measuring the grain passing through predetermined locations in said grain cleaning means during a predetermined period of time;

generating mathematical functions from the grain measurements which are representative of the volume of grain passing through said grain cleaning means;

expanding said mathematical functions to a selected point beyond the rearward portion of said grain cleaning means;

calculating the volume of grain loss which is represented by the expanded portion of said mathematical function; and alerting the operator of the combine harvester when the volume of grain loss exceeds a predetermined value.

* * * * *